(12) United States Patent
Chen et al.

(10) Patent No.: US 9,081,659 B2
(45) Date of Patent: Jul. 14, 2015

(54) CONTROLLING METHOD FOR CONNECTOR, CONNECTOR AND MEMORY STORAGE DEVICE

(71) Applicant: PHISON ELECTRONICS CORP., Miaoli (TW)

(72) Inventors: Chih-Ming Chen, Hsinchu County (TW); Wei-Yung Chen, Hsinchu County (TW); Ming-Hui Tseng, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 443 days.

(21) Appl. No.: 13/692,981

(22) Filed: Dec. 3, 2012

(65) Prior Publication Data
US 2014/0101367 A1    Apr. 10, 2014

(30) Foreign Application Priority Data
Oct. 8, 2012   (TW) .............................. 101137146 A

(51) Int. Cl.
*G06F 1/32* (2006.01)
*G06F 12/02* (2006.01)
*H04B 1/16* (2006.01)
*H04W 52/02* (2009.01)

(52) U.S. Cl.
CPC .......... *G06F 12/0238* (2013.01); *G06F 1/3215* (2013.01); *G06F 1/3278* (2013.01); *H04B 1/1615* (2013.01); *H04W 52/0229* (2013.01); *Y02B 60/126* (2013.01)

(58) Field of Classification Search
CPC ........................... G06F 1/3278; G06F 13/4072
See application file for complete search history.

(56) References Cited

U.S. PATENT DOCUMENTS

| 2010/0081406 A1* | 4/2010 | Tan et al. ...................... 455/218 |
| 2012/0280719 A1* | 11/2012 | Ng et al. .......................... 327/65 |
| 2013/0251016 A1* | 9/2013 | Yap et al. ...................... 375/224 |
| 2014/0359322 A1* | 12/2014 | Cheong ......................... 713/310 |

\* cited by examiner

*Primary Examiner* — Ilwoo Park
(74) *Attorney, Agent, or Firm* — Jianq Chyun IP Office

(57) ABSTRACT

A controlling method for connector is provided, which includes: receiving a first signal stream under a condition that a squelch detector is turned-off; determining whether the first signal stream contains a burst signal under a first operating frequency; if the first signal stream contains the burst signal, turning on the squelch detector and determining by the squelch detector under a second operating frequency whether a second signal stream is a waking signal, wherein the second signal stream is received after receiving the first signal stream and the second operating frequency is greater than the first operating frequency. The controlling method further includes: if the second signal stream is the waking signal, changing an operating state of the connector to an active state. In this way, the power consumption of the connector is reduced.

19 Claims, 8 Drawing Sheets

CONTROLLING METHOD FOR CONNECTOR, CONNECTOR AND MEMORY STORAGE DEVICE

CROSS-REFERENCE TO RELATED APPLICATION

This application claims the priority benefit of Taiwan application Ser. No. 101137146, filed on Oct. 8, 2012. The entirety of the above-mentioned patent application is hereby incorporated by reference herein and made a part of this specification.

BACKGROUND

1. Technology Field

The invention generally relates to a controlling method for connector, and a connector and a memory storage device using the method.

2. Description of Related Art

Digital cameras, mobile phones and MP3 players have grown very rapidly in the past few years, and the demands of the consumers on storing media also are rapid increased. Since rewritable non-volatile memory module (for example, flash memory) features non-volatile data, power saving, small size and no mechanical structure, it is very suitable for being built-in above example-mentioned various portable multimedia devices.

In general, the rewritable non-volatile memory module is controlled by a memory controller and the memory controller is, through a connector, coupled to a host system. According to the standard the connector complies with, the connector has usually several operating states which include at least an active state and an inactive state. Under the active state, the host system can access this rewritable non-volatile memory module. In the inactive state, the memory controller can turn off some of its components or functions to save power consumption. However, in an inactive state, the connector can detect the signal from the host system so as to determine whether to revert to the active state. That is, the connector could have a portion of the components which continuingly operates to detect the signals sent by the host system. Therefore, how to further save power consumed by the connector under the inactive state has become an important issue concerned by the relevant developers.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, in the exemplary embodiments of the invention, it is directed to a controlling method for connector, a connector and a memory storage device, which are able to save the power consumed by the connector under the inactive state.

An exemplary embodiments of the invention provides a controlling method for connector, in which the controlling method includes: receiving a first signal stream under a condition that a squelch detector is turned-off; determining whether the first signal stream contains a burst signal under a first operating frequency; if the first signal stream contains the burst signal, turning on the squelch detector and determining by the squelch detector under a second operating frequency whether a second signal stream is a waking signal, in which the second signal stream is received after receiving the first signal stream and the second operating frequency is greater than the first operating frequency. The controlling method further includes: if the second signal stream is the waking signal, changing an operating state of the connector to an active state.

An exemplary embodiment of the invention provides a memory storage device, which includes a connector, a rewritable non-volatile memory module and a memory controller. The connector is configured to be coupled to a host system. The rewritable non-volatile memory module includes a plurality of physical erasing units. The memory controller is coupled to the connector and the rewritable non-volatile memory module. The connector includes a state controller, a squelch detector and a burst detector. The squelch detector is coupled to the state controller. The burst detector is coupled to the squelch detector for receiving a first signal stream under a condition that the squelch detector is turned-off and determining whether the first signal stream contains a burst signal under a first operating frequency. If the first signal stream contains the burst signal, the burst detector turns on the squelch detector. After the squelch detector is turned on, the squelch detector determines whether a second signal stream is a waking signal under a second operating frequency, in which the second signal stream is received after receiving the first signal stream and the second operating frequency is greater than the first operating frequency. If the second signal stream is the waking signal, the state controller changes an operating state of the connector to an active state.

An exemplary embodiment of the invention provides a connector, which includes a state controller, a squelch detector and a burst detector. The squelch detector is coupled to the state controller. The burst detector is coupled to the squelch detector for receiving a first signal stream under a condition that the squelch detector is turned-off and determining whether the first signal stream contains a burst signal under a first operating frequency. If the first signal stream contains the burst signal, the burst detector turns on the squelch detector. After the squelch detector is turned on, the squelch detector under a second operating frequency determines whether a second signal stream is a waking signal, in which the second signal stream is received after receiving the first signal stream and the second operating frequency is greater than the first operating frequency. If the second signal stream is the waking signal, the state controller changes an operating state of the connector to an active state.

An exemplary embodiment of the invention provides a connector complying with serial advanced technology standard (SATA standard) and includes a low-frequency signal detector, a signal detector control circuit, a high-frequency signal detector, a high-frequency signal determining circuit and a state controller. The signal detector control circuit is coupled to the low-frequency signal detector. The high-frequency signal detector, is coupled to the signal detector control circuit. The high-frequency signal determining circuit is coupled to the high-frequency signal detector. The state controller is coupled to the signal detector control circuit and the high-frequency signal determining circuit. The low-frequency signal detector is configured to receive a first signal stream under a condition that the high-frequency signal detector is turned-off and determine whether the first signal stream contains a first signal model under the first operating frequency. If the first signal stream contains the first signal model, the signal detector control circuit turns on the high-frequency signal detector. After the high-frequency signal detector is turned on, the high-frequency signal detector detects whether the second signal stream contains a second signal model under a second operating frequency, in which the second signal stream is received after receiving the first signal stream and the second operating frequency is greater than the first operating frequency, and the first signal model is different from the second signal model. If the second signal stream contains the second signal model, the state controller changes an operating state of the connector to an active state.

Based on the description above, in the controlling method, the connector and the memory storage device provided by the embodiments of the invention, since the squelch detector is turned off in the condition that the connector is in an inactive state, and at the time, the burst signal come from the host system is detected by the burst detector, the power consumed by the connector is reduced.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the features and advantages of the present invention more comprehensible, the present invention is further described in detail in the following with reference to the embodiments and the accompanying drawings.

DESCRIPTION OF THE EMBODIMENTS

Figure 1A:
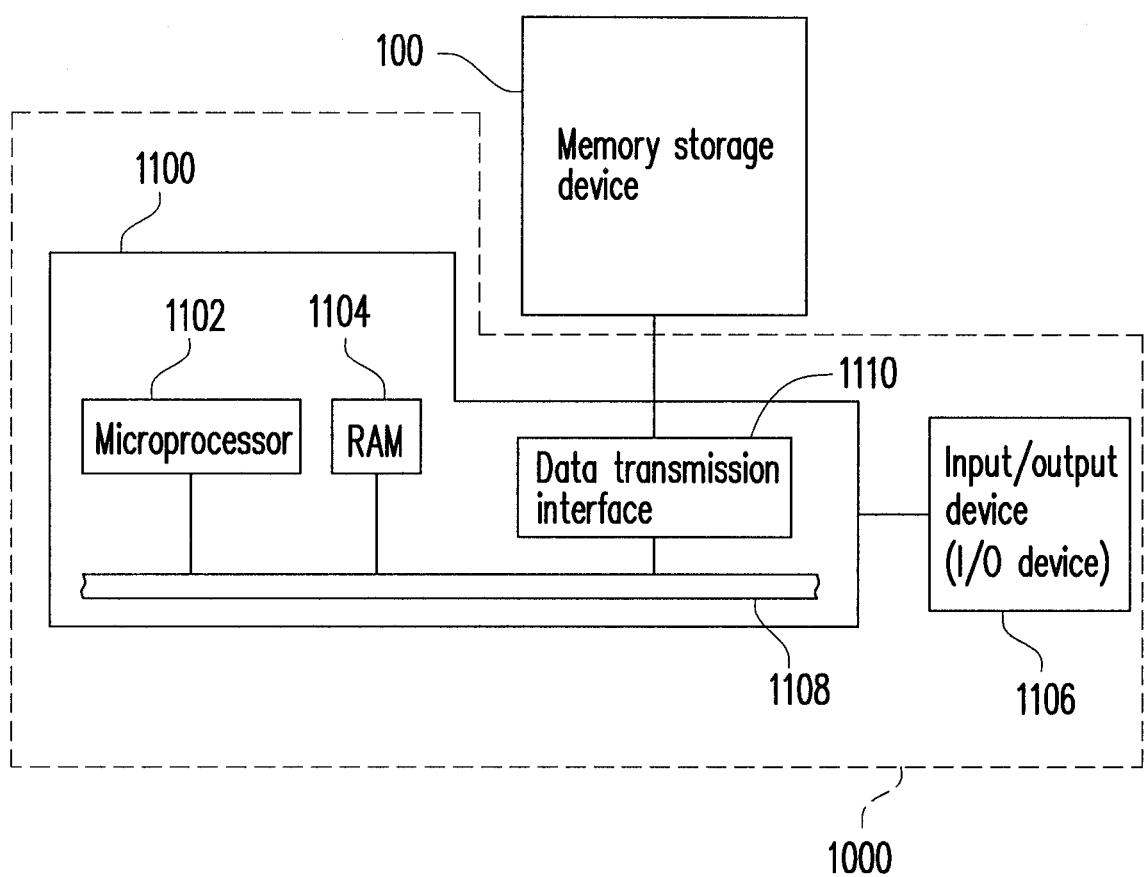
FIG. 1A is a schematic diagram of a host system and a memory storage device according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

The First Exemplary Embodiment

In general, a memory storage device (i.e., memory storage system) includes a plurality of rewritable non-volatile memory modules and a connector (i.e., control circuit). The memory storage device is used usually together with a host system to make the host system able to write data to the memory storage device or read data from the memory storage device.

FIG. 1A is a schematic diagram of a host system and a memory storage device according to an exemplary embodiment of the invention.

Figure 1B:
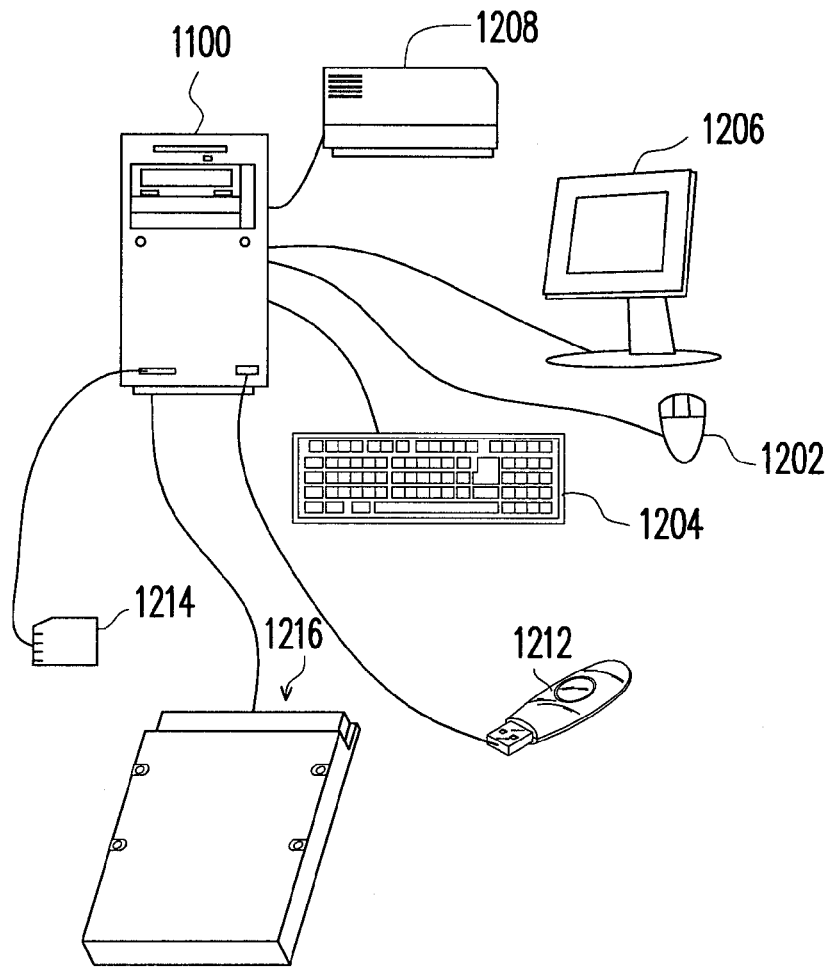
FIG. 1B is a schematic diagram of a computer, an I/O device and a memory storage device according to an exemplary embodiment of the invention.

Referring to FIG. 1A, a host system 1000 usually includes a computer 1100 and an input/output device (I/O device) 1106. The computer 1100 includes a microprocessor 1102, a random access memory (RAM) 1104, a system bus 1108 and a data transmission interface 1110. The I/O device 1106 includes a mouse 1202, a keyboard 1204, a display 1206 and a printer 1208 as shown in FIG. 1B. It should be noted that the devices shown in FIG. 1B do not limit the types of the I/O device 1106, rather can further include other devices.

In an embodiment of the invention, the memory storage device 100 is coupled to other components of the host system 1000 through the data transmission interface 1110. By means of the microprocessor 1102, the RAM 1104 and a data transmission interface 1110, data can be written to or read from the memory storage device 100. The memory storage device 100 can be rewritable non-volatile memory storage device such as a flash drive 1212, a memory card or 1214 or a solid state drive (SSD) 1216 as shown in FIG. 1B.

Figure 1C:
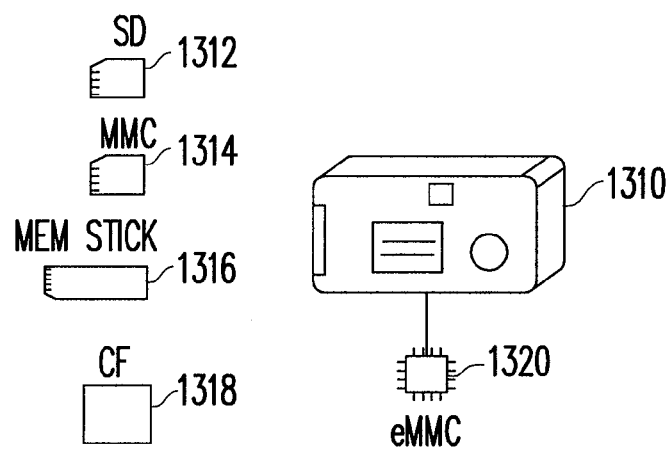
FIG. 1C is a schematic diagram of a host system and a memory storage device according to an exemplary embodiment of the invention.

In general, the host system 1000 can be substantially associated with the memory storage device 100 to form any system for storing data. Although the host system 1000 in the exemplary embodiment is a computer system, but in another exemplary embodiment the host system 1000 may be digital camera, video camera, communication device, audio player or video player or other systems. For example, when the host system is a digital camera (or a video camera) 1310, the rewritable non-volatile memory storage device is an SD card 1312, an MMC card 1314, a memory stick 1316, a CF card 1318 or an embedded storage device 1320 for usage (referring to FIG. 1C). The embedded storage device 1320 includes embedded MMC (eMMC) card. It should be noted that the eMMC card is directly coupled onto the substrate of the host system.

Figure 2:
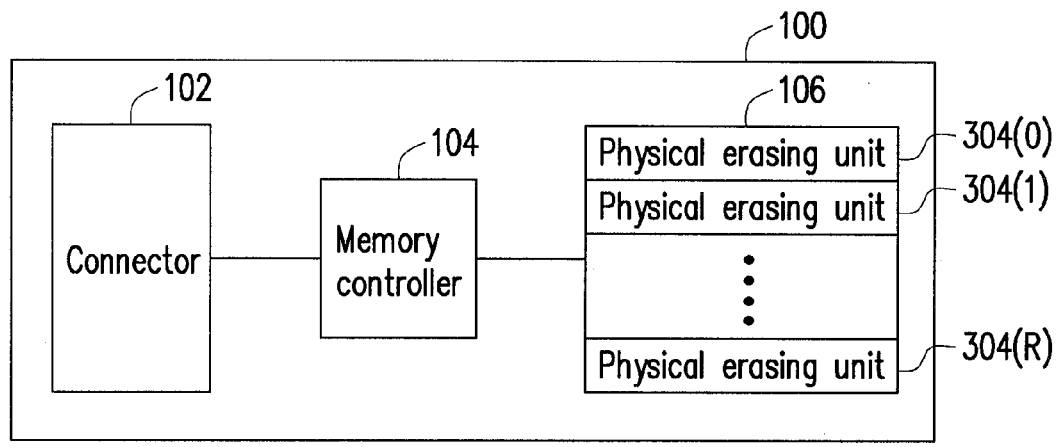
FIG. 2 is a brief block diagram of the memory storage device of FIG. 1A.

FIG. 2 is a brief block diagram of the memory storage device of FIG. 1A.

Referring to FIG. 2, the memory storage device 100 includes a connector 102, a memory controller 104 and a rewritable non-volatile memory module 106.

In the exemplary embodiment, the connector 102 is compliable with serial advanced technology attachment standard (SATA standard), which the invention is not limited to. The connector 102 may be compliable with peripheral component interconnect express (PCI-E) standard or other appropriate standards.

The memory controller 104 is used to execute a plurality of logic gates or control commands implemented in hardware or firmware and can perform operations of writing data, reading data and erasing data in the rewritable non-volatile memory module 106 according to the commands of the host system 1000.

The rewritable non-volatile memory module 106 is coupled to the memory controller 104 for storing the data written by the host system 1000. The rewritable non-volatile memory module 106 has physical erasing units 304(0)-304(R), which, for example, may belong to a same memory die or different memory dies. Each of the physical erasing units respectively has a plurality of physical programming units, and the physical programming units belonging to the same physical erasing unit are independently written and simultaneously erased. Each of the physical erasing units is composed of, for example, 128 physical programming units, which the invention is not limited to. In fact, each of the physical erasing units may be composed of 64 physical programming units, 256 physical programming units or other any number of physical programming units.

In more details, a physical erasing unit is the smallest unit for erasing, i.e., each physical erasing unit contains the smallest number of cells which are simultaneously erased. A physical programming unit is the smallest programmable unit, i.e., a physical programming unit is the smallest unit for writing data. Each of the physical programming units usually includes a data bits region and a redundant bits region. The data bits region includes a plurality of physical access addresses for storing user data, while the redundant bits region is for storing system data (for example, control information and error correction code). In the exemplary embodiment, the data bits region of each the physical programming unit contains 4 physical access addresses therein and a physical access address has size of 512 bytes (512B). However, in other exemplary embodiments, the data bits region may contain 8, 16 or more or fewer physical access addresses therein, which (i.e., the size and the number of physical access addresses) the invention is not limited to. For example, a physical erasing unit is a physical block and a physical programming unit is a physical page or a physical sector.

In the exemplary embodiment, the rewritable non-volatile memory module 106 is a multi-level cell (MLC) NAND flash memory module, that is, a cell has at least 2 bit data stored therein, which the invention is not limited to. The rewritable non-volatile memory module 106 may also be single-level cell (SLC) NAND flash memory module, trinary-level cell (TLC) NAND flash memory module, other flash memory modules or other memory modules with the same characteristic.

Figure 3:
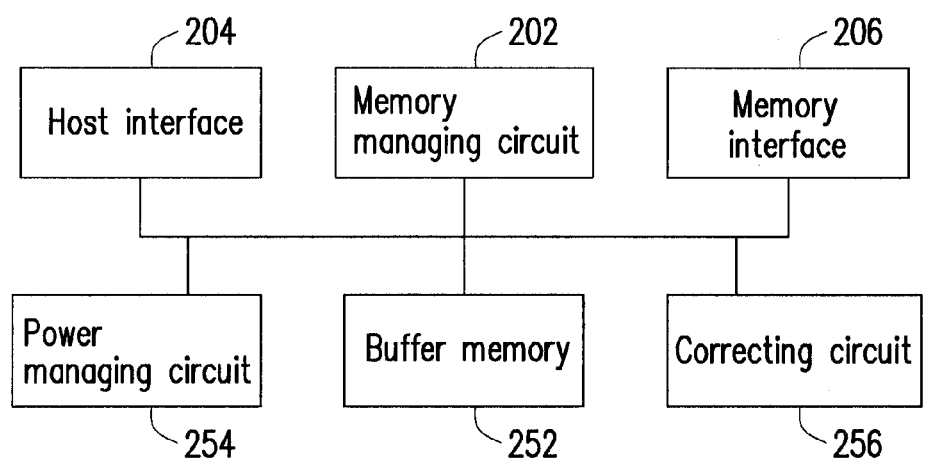
FIG. 3 is a brief block diagram of a memory storage device according to an exemplary embodiment of the invention.

FIG. 3 is a brief block diagram of a memory storage device according to an exemplary embodiment of the invention.

Referring to FIG. 3, the memory controller 104 includes a memory managing circuit 202, a host interface 204 and a memory interface 206.

The memory managing circuit 202 is configured to control the overall operation of the memory controller 104. In more details, the memory managing circuit 202 has a plurality of control commands, and during the memory storage device 100 is running, the control commands are executed to perform operations of writing data, reading data and erasing data.

In the exemplary embodiment, the control commands of the memory managing circuit 202 are implemented in firmware. For example, the memory managing circuit 202 has a microprocessor unit (not shown) and a read-only memory (ROM) (not shown) and the control commands are burned in the ROM. During the memory storage device 100 is running, the microprocessor unit executes the control commands to perform operations of writing data, reading data and erasing data.

In another embodiment of the invention, the control commands of the memory managing circuit 202 may be stored in a special region (for example, the system region for storing the system data in the memory module) of the rewritable non-volatile memory module 106 in program code form. In addition, the memory managing circuit 202 has a microprocessor unit (not shown), an ROM (not shown) and an RAM (not shown). In particular, the ROM has a driving code, and when the memory controller 104 is enabled, the microprocessor unit executes the driving code segment to load the control commands stored in the rewritable non-volatile memory module 106 into the RAM of the memory managing circuit 202, followed by running the control commands through the microprocessor unit to per form operations of writing data, reading data and erasing data.

In yet another exemplary embodiment, the control commands of the memory managing circuit 202 are implemented in a hardware form. For example, the memory managing circuit 202 includes a microcontroller, a memory managing unit, a memory writing unit, a memory reading unit, a memory erasing unit and a data processing unit. The memory managing unit, the memory writing unit, the memory reading unit, the memory erasing unit and the data processing unit are coupled to the microcontroller, in which the memory managing unit is for managing the physical block of the rewritable non-volatile memory module 106; the memory writing unit is for issuing the writing command to the rewritable non-volatile memory module 106 and writing data into the rewritable non-volatile memory module 106; the memory reading unit is for issuing the reading command to the rewritable non-volatile memory module 106 and reading data from the rewritable non-volatile memory module 106; the memory erasing unit is for issuing the erasing command to the rewritable non-volatile memory module 106 so as to erase the data in the rewritable non-volatile memory module 106; the data processing unit is for processing the data to be written to the rewritable non-volatile memory module 106 and reading the data from the rewritable non-volatile memory module 106.

The host interface 204 is coupled to the memory managing circuit 202 to receive and identify the command and the data transmitted by the host system 1000, i.e., the command and the data transmitted by the host system 1000 is sent to the memory managing circuit 202 through the host interface 204. In the exemplary embodiment, the host interface 204 complies with SATA standard, which the invention is not limited to, and the host interface 204 may be compliable with peripheral component interconnect express (PCI-E) standard or other appropriate standards as well.

The memory interface 206 is coupled to the memory managing circuit 202 for accessing the rewritable non-volatile memory module 106. That is, the data to be written to the rewritable non-volatile memory module 106 could be converted by the memory interface 206 to a format acceptable by the rewritable non-volatile memory module 106.

In an exemplary embodiment, the memory controller 104 further includes a buffer memory 252, a power managing circuit 254 and an error checking and correcting circuit 256.

The buffer memory 252 is coupled to the memory managing circuit 202 for registering the command and the data come from the host system 1000 or the data come from the rewritable non-volatile memory module 106.

The power managing circuit 254 is coupled to the memory managing circuit 202 for controlling the power of the memory storage device 100.

The error checking and correcting circuit 256 is coupled to the memory managing circuit 202 to execute an error checking and correcting program to ensure the correctness of the data. In more details, when the memory managing circuit 202 receives the writing command from the host system 1000, the error checking and correcting circuit 256 produces an error checking and correcting code (ECC code) corresponding to the data of the writing command and the memory managing circuit 202 would write the data corresponding to the writing command and the corresponding error checking and correcting code into the rewritable non-volatile memory module 106. After that, when the memory managing circuit 202 reads the data from the rewritable non-volatile memory module 106, the memory managing circuit 202 also simultaneously reads the error checking and correcting code corresponding to the data, and the error checking and correcting circuit 256 would execute the error checking and correcting program on the read data according to the error checking and correcting code.

Figure 4:
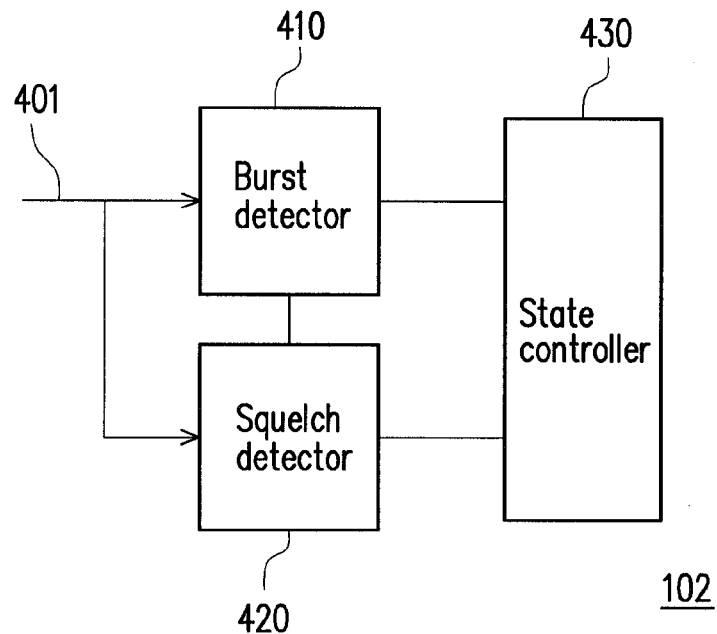
FIG. 4 is a circuit block diagram of a connector according to an exemplary embodiment of the invention.

FIG. 4 is a circuit block diagram of a connector according to an exemplary embodiment of the invention.

Referring to FIG. 4, the connector 102 includes a burst detector 410, a squelch detector 420 and a state controller 430.

The state controller 430 controls the operating state of the connector. When the host system 1000 is reading the memory storage device 100, the operating state of the connector 102 is an active state. On the contrary, if the host system 1000 has no need to access the memory storage device 100, the state controller 430 may control the connector 102 to enter an inactive state. During the inactive state, the connector 102 or the memory controller 104 turn off partial circuits therein to save the power consumption. On the other hand, during the inactive state of the connector 102, if the host system 1000 sends a waking signal to the connector 102, the state controller 430 changes the operating state of the connector 102 to the active state, i.e., the connector 102 is compliable with any standard defining the waking signal. For example, if the connector 102 is compliable with SATA standard, the operating state of the connector 102 includes active state, partial state and slumber state. The partial state and the slumber state together are referred as inactive state. If the connector 102 needs to resume to the active state from the inactive state, it can take some time. In general, the power-saving effect for the slumber state is better than the partial state, but the time required to resume to the active state from the slumber state is longer than the time to resume to the active state from the partial state.

The squelch detector 420 is for detecting the power level of a signal stream 401. The signal stream 401 includes one or a plurality of signals. If the power level of the signal stream 401 is lower than a predetermined level, the squelch detector 420 would turn off unused circuits. For example, when the power level of the signal stream 401 is lower than the predetermined level, the squelch detector 420 would send a message to the state controller 430, and the state controller 430 sets the operating state of the connector 102 as inactive state according to the message. On the other hand, if the power level of the signal stream 401 is higher than the predetermined level (for example, the signal stream 401 contains a waking signal), the squelch detector 420 would drive the state controller 430 to change the operating state of the connector 102 to the active state. In an exemplary embodiment, the signal stream 401 is an OBB-signal. The OBB-signal is a data pattern, which defines gap signals and burst signals. The amplitude of the burst signal rises and falls in a frequency (for example, 1.5 GHz), while the amplitude of the gap signal keeps unchanged. In other words, the signal stream 401 contains one or a plurality of gap signals and burst signals. In the OBB-signal, the waking signal contains at least 6 gap signals and 6 burst signals, the squelch detector 420 detects the gap signals and burst signals and determines whether the signal stream 401 contains the waking signal.

The burst detector 410 is for turning on or off the squelch detector 420 and detecting whether the signal stream 401 contains a burst signal. Specifically, the burst detector 410 is operated under a first operating frequency, while the squelch detector 420 is operated under a second operating frequency, and the second operating frequency is greater than the first operating frequency. Under the second operating frequency, the squelch detector 420 can integrally detect out the gap signals and burst signals. Under the first operating frequency, the burst detector 410 can detect out partial sub-signals in the gap signals and burst signals. For example, the largest frequency of the gap signals and burst signals transmitted between the connector 102 and the host system 1000 is 1.5 GHz; the second operating frequency is 1.5 GHz; the first operating frequency is 750 MHz. Thus, the burst detector 410 can detect out the sub-signal with frequency less than 750 MHz in the gap signals and burst signals.

Figure 5:
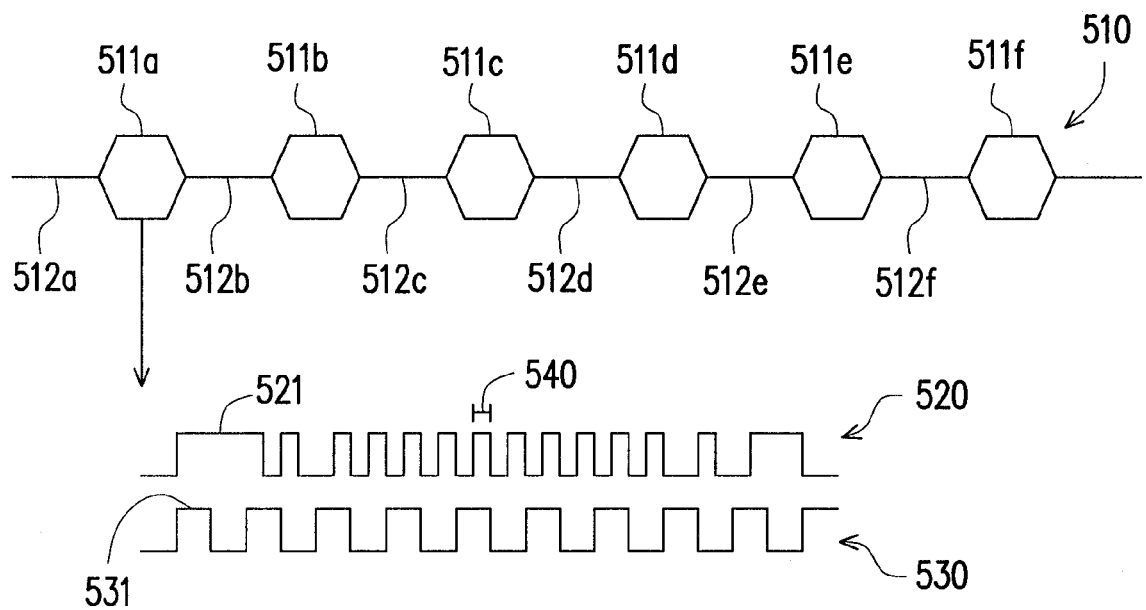
FIG. 5 is a schematic diagram of waking signal, alignment signal and D24.3 characteristic signal according to an exemplary embodiment of the invention.

FIG. 5 is a schematic diagram of waking signal, alignment signal and D24.3 characteristic signal according to an exemplary embodiment of the invention.

Referring to FIG. 5, the waking signal 510 contains burst signals 511a-511f and gap signals 512a-512f, and each of the burst signals is composed of 4 aligning signals 520 or 4 D24.3 characteristic signals 530. The length (i.e., the period) of the sub-signal with the largest frequency in the waking signal 510 is represented by an unit interval. For example, the largest frequency of the waking signal 510 is 1.5 GHz, therefore each unit interval (for example, the unit interval 540) is 1/1.5 G second. The prefix of the aligning signal 521 contains sub-signals 521 with length of 5 unit intervals, and after the prefix, contains sub-signals with length of 1 or 2 unit intervals. The D24.3 characteristic signal 530 is composed of sub-signals with length of 2 unit intervals (for example, the sub-signal 531). In the exemplary embodiment, the operating frequency of the squelch detector 420 is 1.5 GHz so that the squelch detector 420 can integrally detect out sub-signals with any length; the operating frequency of the burst detector 410 is 750 MHz and the burst detector 410 can detect out the sub-signal with length of 2 or more unit intervals (i.e., the sub-signal with frequency less than 750 MHz).

In the exemplary embodiment, when the operating state of the connector 102 is partial/slumber state, the squelch detector 420 is turned off, while the burst detector 410 is turned on. It should be noted that since the second operating frequency is less than the first operating frequency, the consumed power for the running squelch detector 420 is lower than the consumed power for the running squelch detector 420. When the burst detector 410 receives a first signal stream 401, it would firstly determine whether the first signal stream 401 contains a burst signal. For example, the burst detector 410 would determine whether the first signal stream 401 contains sub-signal with length of n or more unit intervals, in which n is positive integer greater than or equal to 2. For example, n is the positive integer 2, so that the burst detector 410 is able to detect out sub-signals 521 and 531. If the first signal stream contains sub-signals with length of n or more unit intervals, the burst detector 410 would determine whether the first signal stream contains a burst signal and turn on the squelch detector 420.

After the squelch detector 420 is woken, the squelch detector 420 receives a second signal stream and determines whether the second signal stream is the waking signal. The second signal stream is the signal delivered to the connector 102 following the first signal stream. For example, the first signal stream contains the burst signal 511a and the second signal stream contains the burst signals 511a-511f. In an exemplary embodiment, if the squelch detector 420 determines out the second signal stream contains m burst signals, the squelch detector 420 concludes the second signal stream is a waking signal, in which m is positive integer (for example, m is 4). In other words, if the burst detector 410 detects a burst signal 511a, it will turn on the squelch detector 420 and then the squelch detector 420 will detect the following burst signals 511a-511f. It should be noted that since the waking signal 510 contains 6 burst signals 511a-511f and 6 gap signals 512a-512f and the burst detector 410 has received the burst signal 512a, thus m is set less than 6 in an exemplary embodiment.

If the squelch detector 420 determines out the second signal stream is a waking signal, the squelch detector 420 will send a message to the state controller 430. Then, the state controller 430 changes the operating state of the connector 102 to the active state according to the message.

In other exemplary embodiments, the largest frequency of the gap signals and burst signals transmitted between the connector 102 and the host system 1000 can be 3.0 GHz (i.e., an unit interval is 1/3G second) or other values, which the invention is not limited to. In an exemplary embodiment, when the largest frequency of the gap signals and burst signals is 3.0 GHz, the first operating frequency is 1.5 GHz and the second operating frequency is 3.0 GHz. However, the first operating frequency and the second operating frequency may be set as other values, which the invention is not limited to.

In an exemplary embodiment, if the waking signal received by the connector 102 is composed of aligning signals, the burst detector 410 may set n as 5. That is, if the first signal stream contains sub-signal with length greater than 5 unit intervals (for example, the sub-signal 521), the burst detector 410 will determine the first signal stream contains the burst signal. As a result, the operating frequency of the burst detector 410 can be set as a lower value (for example, 300 MHz) so as to further reduce the consumed power during the running of the burst detector 410. In other exemplary embodiments, the burst detector 410 may set n as 3, 4 or other values, which the invention is not limited to.

In an exemplary embodiment, if the burst detector 410 is able to detect and determine out whether the received signal contains a burst signal within one burst signal duration, the squelch detector 420 may set m as 5 as well. Alternatively, the squelch detector 420 may sets m as 3 or other values, which the invention is not limited to.

Figure 6:
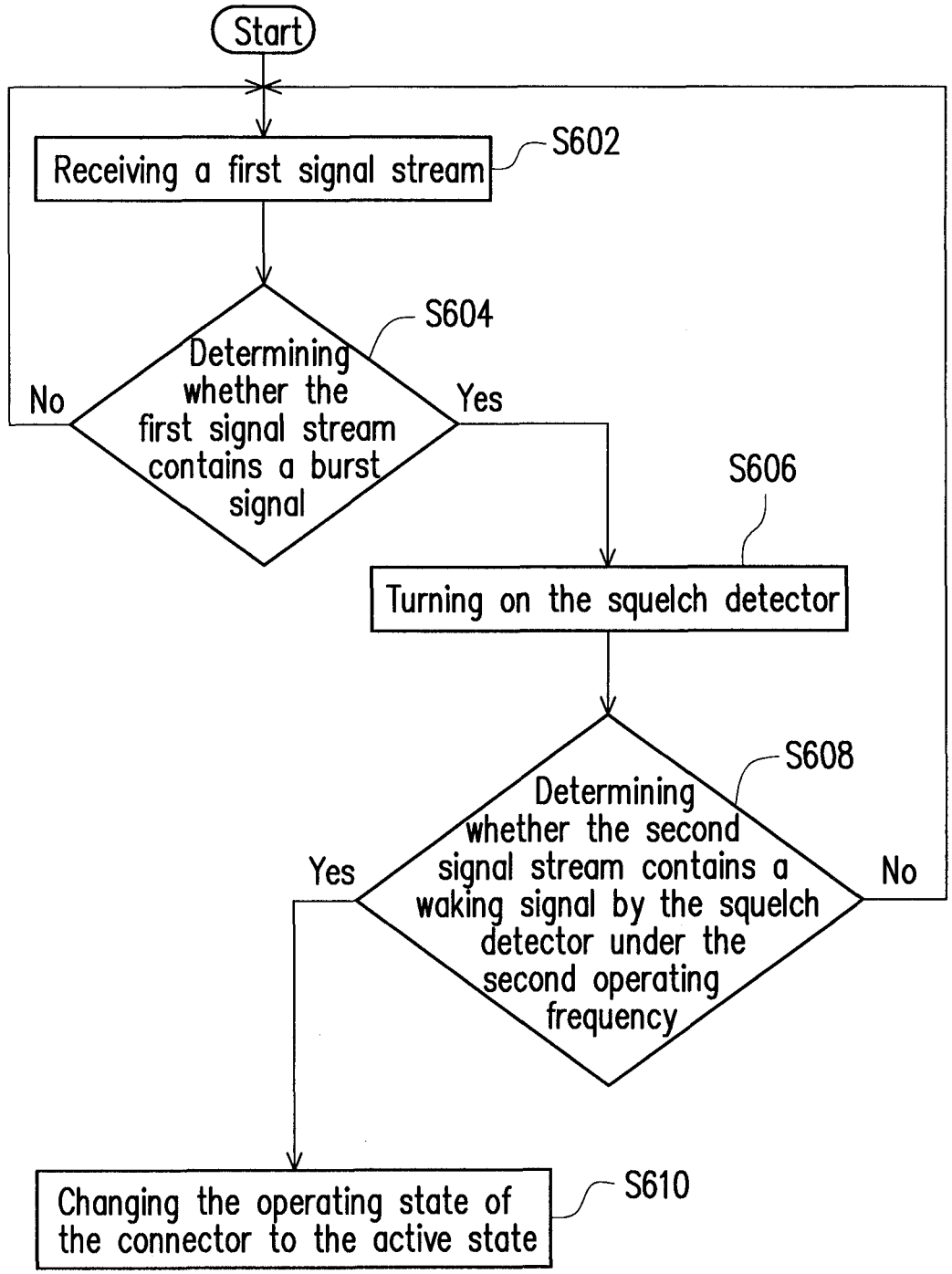
FIG. 6 is a flowchart of a controlling method for connector according to an exemplary embodiment of the invention.

FIG. 6 is a flowchart of a controlling method for connector according to an exemplary embodiment of the invention.

Referring to FIG. 6, in step S602, the burst detector 410 receives a first signal stream under a condition that the squelch detector is turned-off. In step S604, the burst detector 410 determines whether the first signal stream contains a burst signal under the first operating frequency. If the first signal stream does not contain the burst signal, the procedure goes back to step S602. If the first signal stream contains a burst signal, in step S606, the burst detector 410 turns on the squelch detector 420. In step S608, the squelch detector 420 determines whether the second signal stream contains a waking signal under the second operating frequency, in which the second operating frequency is greater than the first operating frequency. If the second signal stream is the waking signal, in step S610, the state controller 430 changes the operating state of the connector to the active state. The content of the related steps in FIG. 5 has described as above, which is omitted to describe.

The Second Exemplary Embodiment

The second embodiment is similar to the first embodiment, only the differences are explained in following.

Figure 7:
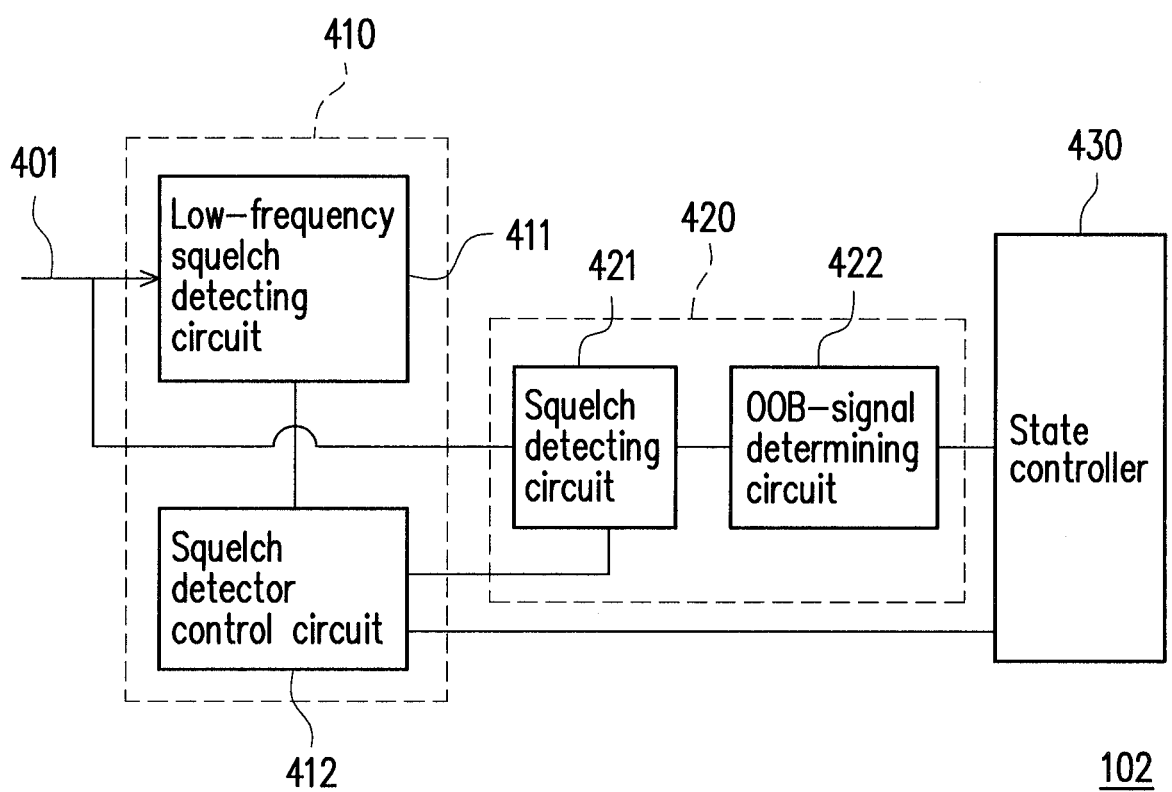
FIG. 7 is a circuit block diagram of a connector according to the second exemplary embodiment of the invention.

FIG. 7 is a circuit block diagram of a connector according to the second exemplary embodiment of the invention.

Referring to FIG. 7, in the second exemplary embodiment, the burst detector 410 includes a low-power squelch detecting circuit 411 and a squelch detector control circuit 412, and the squelch detector 420 includes a squelch detection circuit 421 and an OOB-signal determining circuit 422. The low-power squelch detecting circuit 411 is for detecting a burst signal under the first operating frequency. The squelch detector control circuit 412 is for controlling (e.g. turning on/off) the squelch detection circuit 421. The squelch detection circuit 421 is for detecting the burst signal in a signal under the second operating frequency. The OOB-signal determining circuit 422 is for determining whether a signal is a waking signal.

In more details, when the connector 102 is in partial/slumber state, the squelch detection circuit 421 is turned off. In a condition that the squelch detection circuit 421 is turned-off, the low-power squelch detecting circuit 411 receives a signal stream 401 and determines whether the signal stream 401 contains a sub-signal with length of n or more unit intervals. If the signal stream 401 contains a sub-signal with length of n or more unit intervals, the squelch detector control circuit 412 turns on the squelch detection circuit 421. At the time, the squelch detection circuit 421 continues to receive a second signal stream and detects the burst signal and the gap signal in the second signal stream. The OOB-signal determining circuit 422 determines whether the second signal stream is a waking signal according to the burst signal and the gap signal in the second signal stream. For example, if the second signal stream contains m burst signals, the OOB-signal determining circuit 422 will determine the second signal stream is a waking signal. On the other hand, if the OOB-signal determining circuit 422 determines the second signal stream is not a waking signal, the squelch detector control circuit 412 will turn off the squelch detection circuit 421. At the time, the low-power squelch detecting circuit 411 receives a next signal (third signal), and the low-power squelch detecting circuit 411 determines whether the third signal contains a burst signal.

Figure 8:
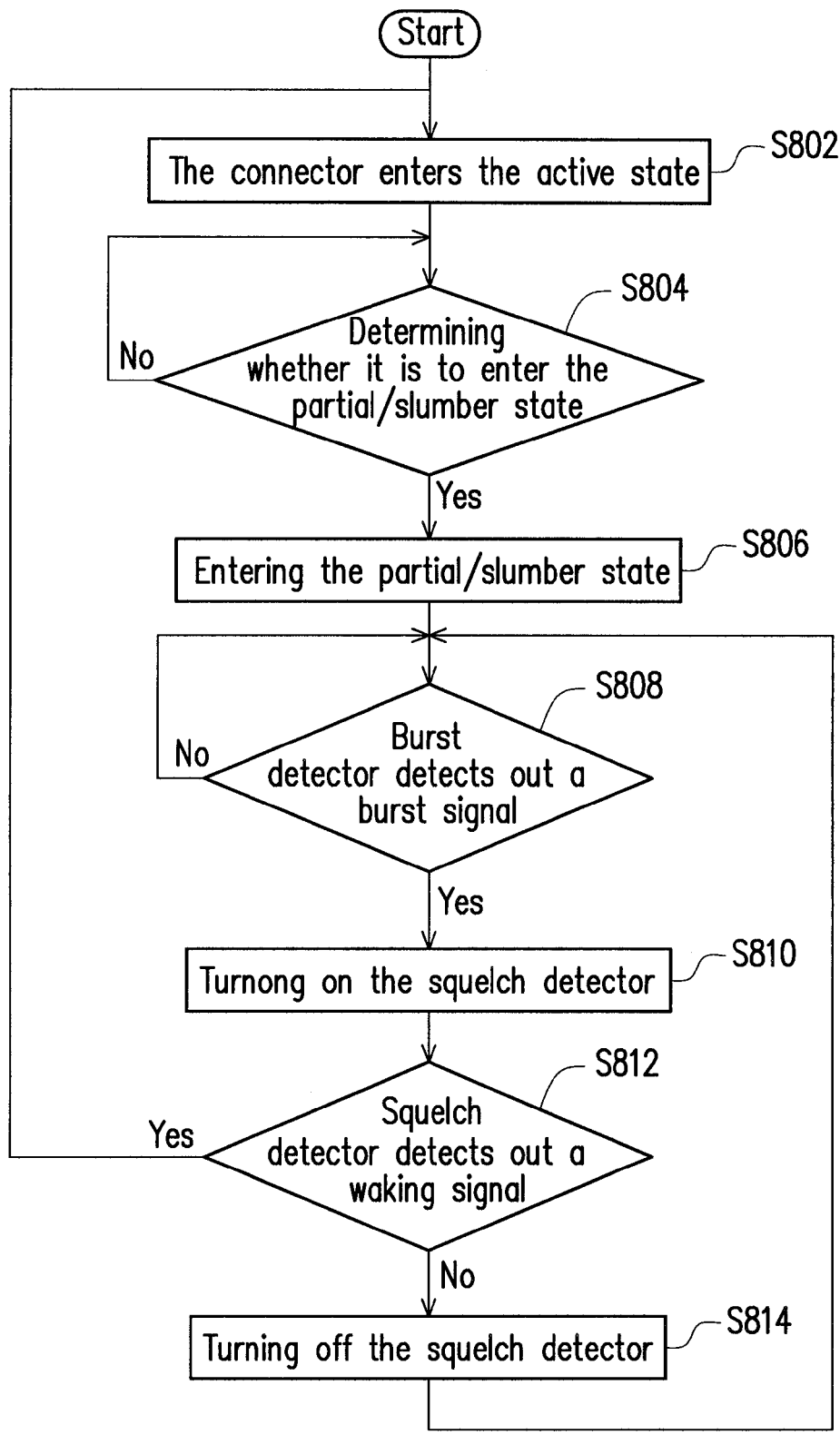
FIG. 8 is a flowchart for the connector switched between the active state and the partial/slumber state according to the second exemplary embodiment of the invention.

FIG. 8 is a flowchart for the connector switched between the active state and the partial/slumber state according to the second exemplary embodiment of the invention.

Referring to FIG. 8, in step S802, the connector 102 enters the active state.

In step S804, the state controller 430 determines whether it is to enter the partial/slumber state. For example, the state controller 430 decides whether it is to enter the partial/slumber state according to the instruction of the host system 1000 or memory controller 104. The state controller 430 may also decide whether it is to enter the partial/slumber state according to the information itself (for example, standby time).

If it is to enter the partial/slumber state, in step S806, the state controller 430 sets the connector 102 to enter the partial/ slumber state. At the time, the squelch detector control circuit 412 turns off the squelch detection circuit 421.

In step S808, the low-power squelch detecting circuit 411 determines whether the burst signal is detected out.

If the low-power squelch detecting circuit 411 detects out the burst signal, In step S810, the squelch detector control circuit 412 turns on the squelch detection circuit 421.

In step S812, the squelch detector 420 determines whether the waking signal is detected out. Specifically, the squelch detection circuit 421 detects the burst signal in the second signal stream and the OOB-signal determining circuit 422 determines whether the second signal stream is the waking signal.

If the squelch detector 420 determines out the second signal stream is a waking signal, the procedure goes back to step S802, where the state controller 430 controls the connector 102 entering the active state. If the squelch detector 420 does not detect out the waking signal, in step S814, the squelch detector control circuit 412 turns off the squelch detection circuit 421 and goes back to step S808. The content of the related steps in FIG. 8 has described as above, which is omitted to describe.

The Third Exemplary Embodiment

Figure 9:
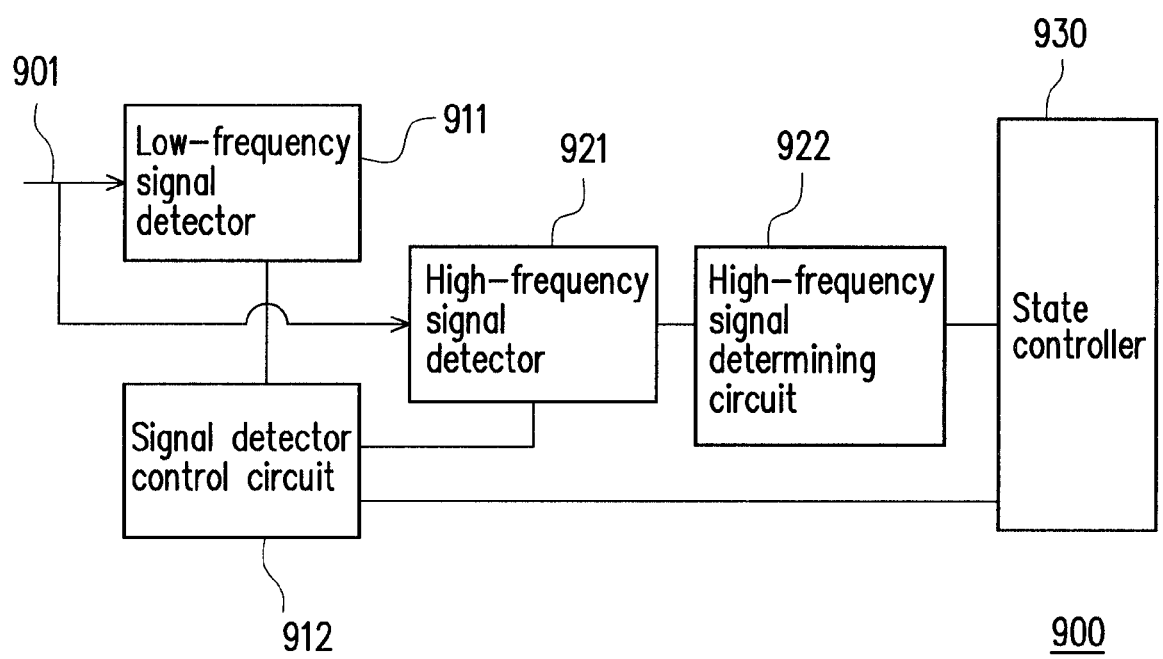
FIG. 9 is a circuit block diagram of a connector according to the third exemplary embodiment of the invention.

FIG. 9 is a circuit block diagram of a connector according to the third exemplary embodiment of the invention.

Referring to FIG. 9, the connector 900 includes a low-frequency signal detector 911, a signal detector control circuit 912, a high-frequency signal detector 921, a high-frequency signal determining circuit 922 and a state controller 930. The connector 900 is compliable with SATA standard and the signal stream 901 herein is compliable with the definition of the OOB-signal. The connector 900 may be disposed in a host system, a hard disk, a flash drive, a solid-state drive, a personal computer or a server, which the invention is not limited to.

When the connector 900 is in partial/slumber state, the high-frequency signal detector 921 is turned off and the low-frequency signal detector 911 is turned on. The low-frequency signal detector 911 is for receiving the signal stream 901 (i.e., the first signal stream) in the condition that the high-frequency signal detector 921 is turned-off and determines whether the first signal stream contains a first signal stream model under the first operating frequency. For example, the low-frequency signal detector 911 determines whether the first signal stream has a certain number of burst signals (first burst signals). If the first signal stream has the certain number of burst signals, the low-frequency signal detector 911 concludes the first signal stream contains the first signal model. The first burst signal can be pulse signal compliable with a specific frequency and the frequency is, for example, not over 750 MHz. If the first signal stream contains the first burst signal, the signal detector control circuit 912 will turn on the high-frequency signal detector 921. After that, the high-frequency signal detector 921 continues to receive a second signal stream and detects whether the second signal stream contains a second signal model under the second operating frequency, in which the first signal model is different from the second signal model. The second signal model is composed of, for example, several gap signals and several second burst signals. The second burst signal may be pulse signal compliable with a specific frequency and the frequency of the second burst signal may be the same as or different from the first burst signal. For example, the high-frequency signal determining circuit 922 determines whether the second signal stream is a waking signal according to the second burst signal and the gap signal detected out by the high-frequency signal detector 921. For example, the waking signal in the OOB-signal can be composed of at least 6 gap signals and 6 second burst signals. In particular, the first operating frequency is lower than the second operating frequency. For example, the first operating frequency is not greater than half of the second operating frequency, which the invention is not limited to. If the second signal stream contains a second signal model (for example, the waking signal), the state controller 930 will change the operating state of the connector 900 to the active state.

In summary, in the controlling method, the connector and the memory storage device provided by the embodiments of the invention, since the burst detector detects the burst signal under the first operating frequency and after detecting out the burst signal, the squelch detector with larger power consumption is turned on, so that the power consumed by the connector in inactive state is reduced.

The previously described exemplary embodiments of the present invention have the advantages aforementioned, wherein the advantages aforementioned not required in all versions of the invention.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:

1. A controlling method for connector, wherein the connector comprises a squelch detector, the controlling method comprising:
   receiving a first signal stream under a condition that the squelch detector is turned-off;
   determining whether the first signal stream comprises a burst signal under a first operating frequency;
   if the first signal stream comprises the burst signal, turning on the squelch detector and determining whether a second signal stream is a waking signal by the squelch detector under a second operating frequency, wherein the second signal stream is received after receiving the first signal stream and the second operating frequency is greater than the first operating frequency; and
   if the second signal stream is the waking signal, changing an operating state of the connector to an active state.

2. The controlling method as claimed in claim 1, further comprising:
   if the second signal stream is not the waking signal, turning off the squelch detector, receiving a third signal and determining whether the third signal comprises the burst signal.

3. The controlling method as claimed in claim 1, wherein step of determining whether the first signal stream comprises the burst signal under the first operating frequency comprises:
   determining whether the first signal stream comprises a sub-signal with a length greater than or equal to n unit-intervals under the first operating frequency, wherein n is a positive integer greater than or equal to 2; and
   if the first signal stream comprises the sub-signal, determining the first signal stream comprises the burst signal.

4. The controlling method as claimed in claim 3, wherein the positive integer n is 5.

5. The controlling method as claimed in claim 1, wherein step of determining whether the second signal stream is the waking signal by the squelch detector under the second operating frequency comprises:

determining whether the second signal stream comprises m burst signals by the squelch detector, wherein m is a positive integer; and if the second signal stream comprises the m burst signals, determining the second signal stream is the waking signal by the squelch detector.

6. A memory storage device, comprises:

a connector, configured to couple to a host system;

a rewritable non-volatile memory module, comprising a plurality of physical erasing units; and a memory controller, coupled to the connector and the rewritable non-volatile memory module, wherein the connector comprises:
   a state controller;
   a squelch detector, coupled to the state controller; and
   a burst detector, coupled to the squelch detector, configured to receive a first signal stream under a condition that the squelch detector is turned-off, and determine whether the first signal stream comprises a burst signal under a first operating frequency,
   wherein if the first signal stream comprises the burst signal, the burst detector turns on the squelch detector,
   after the squelch detector is turned on, the squelch detector is configured to determine whether a second signal stream is a waking signal under a second operating frequency, wherein the second signal stream is received after receiving the first signal stream and the second operating frequency is greater than the first operating frequency,
   the state controller is configured to change an operating state of the connector to an active state if the second signal stream is the waking signal.

7. The memory storage device as claimed in claim 6, wherein if the second signal stream is not the waking signal, the burst detector is configured to turn off the squelch detector, receive a third signal and determine whether the third signal comprises the burst signal.

8. The memory storage device as claimed in claim 6, wherein the operation that the burst detector determines whether the first signal stream comprises the burst signal under the first operating frequency comprises;
   the burst detector determines whether the first signal stream comprises a sub-signal with a length greater than or equal to n unit-intervals under the first operating frequency, wherein n is a positive integer greater than or equal to 2; and
   if the first signal stream comprises the sub-signal, the squelch detector determines the first signal stream comprises the burst signal.

9. The memory storage device as claimed in claim 8, wherein the positive integer n is 5.

10. The memory storage device as claimed in claim 6, wherein the operation that the squelch detector determines whether the second signal stream is the waking signal comprises:
   the squelch detector determines whether the second signal stream comprises m burst signals, wherein m is a positive integer;
   if the second signal stream comprises the m burst signals, the squelch detector determines the second signal stream is the waking signal.

11. The memory storage device as claimed in claim 6, wherein the squelch detector comprises:
   a low-power squelch detector; and
   a squelch detector control circuit, coupled to the low-power squelch detector, the squelch detector comprises:
   a squelch detection circuit, coupled to the squelch detector control circuit; and
   an out-of-band signal determining circuit, coupled to the squelch detection circuit and the state controller,
   wherein the low-power squelch detector is configured to receive the first signal stream under a condition that the squelch detection circuit is turned-off, and determine whether the first signal stream comprises the burst signal under the first operating frequency,
   the squelch detector control circuit is configured to turn on the squelch detection circuit if the first signal stream comprises the burst signal,
   after the squelch detection circuit is turned on, the squelch detection circuit is configured to detect a second burst signal and a gap signal in the second signal stream under the second operating frequency, and the out-of-band signal determining circuit is configured to determine whether the second signal stream is the waking signal according to the second burst signal and the gap signal.

12. A connector, comprising:

a state controller;

a squelch detector, coupled to the state controller; and a burst detector, coupled to the squelch detector, configured to receive a first signal stream under a condition that the squelch detector is turned-off, and determine whether the first signal stream comprises a burst signal under a first operating frequency, wherein if the first signal stream comprises the burst signal, the burst detector turns on the squelch detector, after the squelch detector is turned on, the squelch detector is configured to determine whether a second signal stream is a waking signal under a second operating frequency, wherein the second signal stream is received after receiving the first signal stream and the second operating frequency is greater than the first operating frequency, the state controller is configured to change an operating state of the connector to an active state if the second signal stream is the waking signal.

13. The connector as claimed in claim 12, wherein if the second signal stream is not the waking signal, the burst detector is further configured to turn off the squelch detector, receive a third signal and determine whether the third signal comprises the burst signal.

14. The connector as claimed in claim 12, wherein the operation that the burst detector determines whether the first signal stream comprises the burst signal under the first operating frequency comprises;
   the burst detector determines whether the first signal stream comprises a sub-signal with a length greater than or equal to n unit-intervals under the first operating frequency, wherein n is a positive integer greater than or equal to 2; and
   if the first signal stream comprises the sub-signal, the squelch detector determines the first signal stream comprises the burst signal.

15. The connector as claimed in claim 14, wherein the positive integer n is 5.

16. The memory storage device as claimed in claim 12, wherein the operation that the squelch detector determines whether the second signal stream is the waking signal comprises:
   the squelch detector determines whether the second signal stream comprises m burst signals, wherein m is a positive integer;

if the second signal stream comprises the m burst signals, the squelch detector determines the second signal stream is the waking signal.

17. The connector as claimed in claim 12, wherein the squelch detector comprises:
   a low-power squelch detector; and
   a squelch detector control circuit, coupled to the low-power squelch detector,
   the squelch detector comprises:
   a squelch detection circuit, coupled to the squelch detector control circuit; and
   an out-of-band signal determining circuit, coupled to the squelch detection circuit and the state controller,
   wherein the low-power squelch detector is configured to receive the first signal stream under a condition that the squelch detection circuit is turned-off, and determine whether the first signal stream comprises the burst signal under the first operating frequency,
   the squelch detector control circuit is configured to turn on the squelch detection circuit if the first signal stream comprises the burst signal,
   after the squelch detection circuit is turned on, the squelch detection circuit is configured to detect a second burst signal and a gap signal in the second signal stream under the second operating frequency, and the out-of-band signal determining circuit is configured to determine whether the second signal stream is the waking signal according to the second burst signal and the gap signal.

18. A connector, complying with serial advanced technology standard (SATA standard) and comprising:
   a low-frequency signal detector;
   a signal detector control circuit, coupled to the low-frequency signal detector;
   a high-frequency signal detector, coupled to the signal detector control circuit;
   a high-frequency signal determining circuit, coupled to the high-frequency signal detector;
   a state controller, coupled to the signal detector control circuit and the high-frequency signal determining circuit,
   wherein the low-frequency signal detector is configured to receive a first signal stream under a condition that the high-frequency signal detector is turned-off, and determine whether the first signal stream comprises a first signal model under the first operating frequency,
   the signal detector control circuit is configured to turn on the high-frequency signal detector if the first signal stream comprises the first signal model,
   after the high-frequency signal detector is turned on, the high-frequency signal detector is configured to detect whether the second signal stream comprises a second signal model under a second operating frequency, wherein the second signal stream is received after receiving the first signal stream, the second operating frequency is greater than the first operating frequency, and the first signal model is different from the second signal model,
   the state controller is configured to change an operating state of the connector to an active state if the second signal stream comprises the second signal model.

19. The connector as claimed in claim 18, wherein the first operating frequency is not greater than a half of the second operating frequency.

* * * * *